US008592028B2

(12) United States Patent
Schosseler et al.

(10) Patent No.: US 8,592,028 B2
(45) Date of Patent: Nov. 26, 2013

(54) BI-AXIALLY STRETCHED BREATHABLE FILM, PROCESS FOR MAKING THE SAME AND USE THEREOF

(75) Inventors: Lucien Schosseler, Luxembourg (LU); Alexis Grosrenaud, Hautcharage (LU); Duncan Henry MacKerron, Middlesbrough (GB); Valery Rebizant, Luxembourg (LU)

(73) Assignee: DuPont Teijin Films U.S. Limited Partnership, Chester, VA (US)

( * ) Notice: Subject to any disclaimer, the term of this patent is extended or adjusted under 35 U.S.C. 154(b) by 160 days.

(21) Appl. No.: 11/990,963

(22) PCT Filed: Aug. 25, 2006

(86) PCT No.: PCT/EP2006/008350
§ 371 (c)(1),
(2), (4) Date: Feb. 25, 2008

(87) PCT Pub. No.: WO2007/022990
PCT Pub. Date: Mar. 1, 2007

(65) Prior Publication Data
US 2009/0117362 A1 May 7, 2009

(30) Foreign Application Priority Data
Aug. 25, 2005 (EP) .................................... 05291786

(51) Int. Cl.
*B32B 5/16* (2006.01)
*C08G 63/02* (2006.01)
*B29C 49/14* (2006.01)

(52) U.S. Cl.
USPC ........... 428/323; 428/332; 428/337; 428/339; 525/437; 524/539; 264/210.7; 264/210.2; 264/210.5; 264/235.8

(58) Field of Classification Search
USPC ........ 428/220, 480, 317.9, 319.3, 319.7, 323, 428/332, 337, 339; 525/437; 524/539; 264/210.7, 210.2, 210.5, 235.8
See application file for complete search history.

(56) References Cited

U.S. PATENT DOCUMENTS

| 3,890,421 | A |   | 6/1975  | Habozit                  |
|-----------|---|---|---------|--------------------------|
| 3,907,926 | A | * | 9/1975  | Brown et al. ..... 524/258 |
| 4,493,870 | A | * | 1/1985  | Vrouenraets et al. ..... 442/236 |
| 4,675,582 | A |   | 6/1987  | Hommes et al.            |
| 4,825,111 | A |   | 4/1989  | Hommes et al.            |
| 4,853,602 | A |   | 8/1989  | Hommes et al.            |
| 4,919,875 | A | * | 4/1990  | Wang ..... 264/210.2      |
| 4,966,950 | A | * | 10/1990 | Wang ..... 525/444        |
| 5,051,225 | A |   | 9/1991  | Hommes et al.            |
| 5,072,493 | A |   | 12/1991 | Hommes et al.            |
| 5,429,785 | A |   | 7/1995  | Jolliffe                 |
| 5,434,000 | A | * | 7/1995  | Konagaya et al. ..... 428/329 |
| 5,562,977 | A | * | 10/1996 | Jager et al. ..... 442/184 |
| 5,846,642 | A |   | 12/1998 | Kimura et al.            |
| 5,885,501 | A |   | 3/1999  | Gardner et al.           |
| 5,912,060 | A |   | 6/1999  | Kishida et al.           |
| 6,436,531 | B1|   | 8/2002  | Kollaja et al.           |
| 6,458,437 | B1|   | 10/2002 | Ito et al.               |
| 6,582,810 | B2|   | 6/2003  | Heffelfinger             |
| 2002/0076554 | A1 |   | 6/2002 | Stopper                |
| 2002/0098353 | A1 |   | 7/2002 | Kollaja et al.         |
| 2004/0086684 | A1 | * | 5/2004 | Suzuki et al. ..... 428/98 |
| 2004/0254332 | A1 | * | 12/2004| Hayes ..... 528/296      |
| 2007/0128427 | A1 | * | 6/2007 | Suzuki et al. ..... 428/317.9 |
| 2008/0023887 | A1 | * | 1/2008 | Vollenberg et al. ..... 264/500 |

FOREIGN PATENT DOCUMENTS

| EP | 644226      | 3/1995  |
| JP | 2002003707  | 1/2002  |
| JP | 2003-268130 | 9/2003  |
| WO | WO0185451   | 11/2001 |

OTHER PUBLICATIONS

Translation of JP 2003-020348, Matsui et al., "Polyester Film for Metal Sheet Lamination", Jan. 24, 2003.*
Translation of JP 2001-011213, Matsui et al., "Flexible Polyester Film", Jan. 16, 2001.*
Translation of JP 2003-268130, Munehiro Miyake, Sep. 25, 2003.*
Cho, Iwhan, "Macromer Technology," *Polymer* (Korea), 4(3):210-215, May 1980.

* cited by examiner

*Primary Examiner* — Hai Vo
(74) *Attorney, Agent, or Firm* — RatnerPrestia

(57) ABSTRACT

The invention relates to A bi-axially stretched breathable film comprising a polymeric mixture, said polymeric mixture comprising based on the total weight of the polymeric mixture/—at least 50% of at least one polyether block copolymer; and —from 0.5 to less than 50% of at least one polyester. The invention also relates to a method to manufacture said film, and uses of said film. The invention also relates to a method for producing a bi-axially stretched breathable film comprising at least one polyether block copolymer.

30 Claims, 2 Drawing Sheets

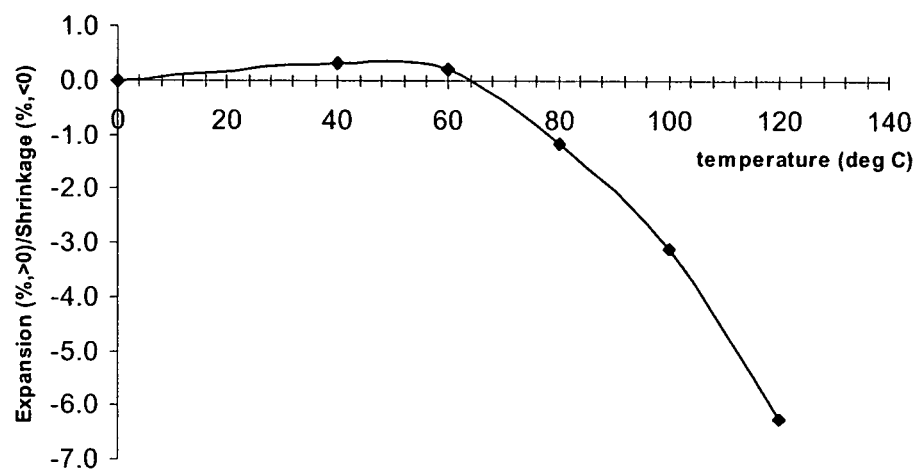
Fig.1 : typical expansion/shrinkage of stretched film (C9)

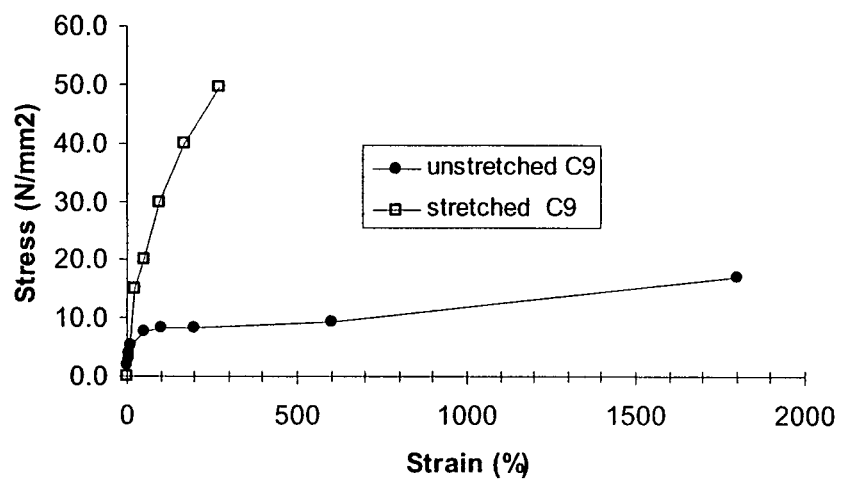
Fig. 2: Stress-Strain curve for an stretched and cast film

BI-AXIALLY STRETCHED BREATHABLE FILM, PROCESS FOR MAKING THE SAME AND USE THEREOF

This application is the National Stage filing of PCT Application No. EP2006/008350, filed 25 Aug. 2006, which claims priority benefit of EP Application No. 05291786.1, filed 25 Aug. 2005, the entire disclosure of which is incorporated herein by reference.

FIELD OF THE INVENTION

This invention relates to a bi-axially stretched breathable film. The invention also relates to the process of manufacturing and the use of such a film.

BACKGROUND OF THE INVENTION

Films comprising a mixture of polyester and polyether block copolymers are described in the prior art, as for example in WO 01/85451. WO 01/84451 discloses a mixture for making cards, said mixture comprising an amorphous copolyester and a thermoplastic polyester elastomer such as Hytrel® in amounts of more than 20% and less than 50% wt thermoplastic polyester elastomer.

In U.S. Pat. No. 6,436,531 each polymer is present in amounts of about 20 to about 80% wt based on the total weight of the blend, more preferably in an amount of at least 40% wt. A composition comprising 40% wt of Polyethylene Terephtalate (PET) and 60% wt of Hytrel®, based on the total weight of the blend. However in U.S. Pat. No. 6,436,531, the film is not biaxially stretched.

Biaxially stretched films are known in the art. U.S. Pat. No. 5,846,642 discloses a polyester film comprising a polyester mixed with a polyester based elastomer such as Hytrel® or Arnitel® at a ratio of 81:19 to 98:2 laminated with another polyester. This cast polyester film can be simultaneously or sequentially biaxially stretched.

JP 2002003707 discloses a biaxially oriented polyester film having an impact resistance in addition to linearly tearable properties without damaging gas-barrier properties. The film is obtained by dispersing a polyether-ester elastomer in the proportion of 5-30% wt in a PET and is characterised in that the elastomer contains 21-60% wt of polytetramethylene glycol (PTMG).

U.S. Pat. No. 5,912,060 discloses a mixture of thermoplastic polyester resins such as PET and polyester block copolymer as polyether ester block copolymer, in respective amounts of 50 to 95% wt and 50 to 5% wt. The film obtained can be biaxially stretched. The polyester block polymer of this reference can be a polyether; the sole disclosure is in a blend with 20% of the polyether. At such concentrations, the final film is not breathable. U.S. Pat. No. 6,458,437 discloses heat-shrinkable polyester films produced from polyester compositions containing polyesters at 50-95% wt of said polyester composition and polyester elastomers at 3-50% wt of said composition. The dicarboxylic acid components constituting the polyesters used may include terephthalic acid and the diol components constituting the polyesters used may include ethylene glycol. Polyester elastomers refer to polyester block copolymers composed of soft and hard segments, wherein the soft segments may be polyether ester segments, i.e. polyester elastomers can be polyether block copolymers. These films can be biaxially stretched. EP 644 226 discloses an easily tearable film made of two or more thermoplastic resins having an islands-sea structure comprising a continuous and a dispersed phase. The film may be biaxially stretched. Among others, Polyethylene terephthalate and polyester elastomers as Hytrel® are cited. The proportions of the different phase is so that the continuous phase/dispersed phase equals about 35-98/2-65, preferably about 50-95/5-50% wt. A compatibilizing agent may be added to the combination of the thermoplastic resins in order to make the dispersed particles finer. However the amount of this compatibilizing agent should not exceed 30 parts by weight relative to 100 parts by weight of the total weight of the thermoplastic resins composing the continuous and the dispersed phase otherwise the islands-sea structure may disappear.

Breathable films are known in the art. US 2002/0076554 discloses polyether block copolymers producing inherently breathable films, such as Pebax® and Hytrel®. This patent application also discloses films which are biaxially stretched to become breathable films. In this patent application, breathability is imparted to the biaxially stretched film by using fillers in the film polymer formulation, extruding the filler/matrix polymer formulation into a film and then stretching the film sufficiently to create voids around the particles, thereby making the film breathable.

U.S. Pat. No. 6,582,810 also discloses such a breathable and elastic film based on an extruded filler/matrix polymer formulation stretched to impart breathability. In this patent, the matrix polymer formulation which may constitute about 35 to 95% by weight of the breathable film can be a polyamide polyether block copolymer, and the filler particles may be polyethylene terephthalate. Multi-block elastomeric copolymers, such as Pebax® polyether block amide, Hytrel® polyester can be used as elastic fibers to provide elasticity. According to U.S. Pat. No. 6,582,810, when the film is desired to have superior breathability and moderate strength, the breathable film may include about 30-55% wt of the matrix polymer, and 45-70% wt of the particulate filler.

US 2002/098353 discloses various blends of polymers. Examples 21-24 of said documents disclose blends with 50% or 60% of a polyether polymer such as Hytrel together with a polyester. The film is merely cast and is not stretched. The film in this document is used for the manufacture of tapes that will withstand high temperatures. There is no mention of the breathability of the films, and no mention of any end-use that may require said property.

Method for drawing plastic films simultaneously in both longitudinal and lateral directions is also known in the art. Indeed, U.S. Pat. No. 3,890,421 discloses such a method; its content is incorporated therein by reference.

Although some of the foregoing films known in the art may be either breathable or biaxially stretched, none of them is a breathable film that is bi-axially stretched. Breathable film are useful in many applications as they exhibit special gas selective properties and liquid permeation properties. Biaxially stretched films are sought for as biaxially stretching improves some properties of plastic films, such as resistance, elasticity and reduces the thickness of the films. The problem faced when trying to sequentially bi-axially stretch the breathable film known in the art is that the film breaks or shrinks. There is thus a need for a breathable film which can be biaxially stretched, i.e. a composition which enables the production of such a film together with a method of manufacturing such a film, in order to improve the mechanical and the thermal properties of breathable films.

SUMMARY OF THE INVENTION

The invention relates to:
1). A bi-axially stretched breathable film comprising a polymeric mixture, said polymeric mixture comprising based on the total weight of the polymeric mixture
   at least 50% of at least one polyether block copolymer; and
   from 0.5 to less than 50% of at least one polyester.
2). A method for producing the film according to the invention comprising the steps of:
   (1) forming the polymeric mixture as a cast film, and
   (2) simultaneously or sequentially bi-axially stretching the cast film of step (1), preferably sequentially stretching for films where the content of PET or PET copolymer is from 15 to 50%.
3). A method for producing a bi-axially stretched breathable film comprising at least one polyether block copolymer, said method comprising the steps of
   (1) forming a cast film, and
   (2) simultaneously bi-axially stretching the cast film of step (1), where said stretching comprises the steps of
      (i) grasping sequentially successive portions of the cast film along opposite edges of the cast film with opposed pairs of clamps mounted on carriages;
      (ii) advancing the carriages downstream along paths adjacent a center line extending equidistant between the carriages after the clamps have grasped the film while maintaining the pairs of clamps aligned along a second line normal to the extent of the center line, said step of advancing the carriages further including the step of moving the carriages laterally away from the center line extending equidistant therebetween as the carriages advance downstream, where said advancement of the carriages is effected by accelerating each downstream carriage relative to the adjacent upstream carriage.
4). Use of the film of the invention for the production of packaging films, protective apparel, apparel, membrane.
5). The film of the invention further associated with at least one support selected from the group consisting of plastic, fibrous non-woven, woven fabric, stretch fabric, paper, polyolefin and polyester, and a method for its production.

BRIEF DESCRIPTION OF THE FIGURES

FIG. 1 depicts the shrinkage of film (example 9) in function of the temperature;

FIG. 2 depicts the evolution of the stress in function of the elongation of the film (example 9).

DETAILED DESCRIPTION OF EMBODIMENTS OF THE INVENTION

The polyether block copolymer used in the present invention comprises high melting point crystalline polymer segments (hard segments) and low melting point soft polymer crystalline polymer segments (soft segments).

The polyether block copolymer used in the present invention is any polyether block copolymer exhibiting breathable properties. Polyether block copolymer exhibiting breathable properties as used herein means that (according to ASTM D570 method) after a 24 hours immersion in water the polymer is subject to a weight increase at a temperature of 23° C. of 1.5% minimum. Stated otherwise, the polyether is hydrophilic.

The polyether block copolymer of this invention can for example be a polyetherester, a polyetherurethane, a polyetheresterurethane, a polyetheramide, a polyetheresteramide, or mixture thereof. A preferred polyether is polyetherester.

Polyetheramide for example comprises polyether sequences with hydroxy ends bound to polyamide sequences with acid ends. Such a structure may also comprise diol (for example butanediol-1,4).

Polyetherurethane for example comprises polyether sequences with hydroxy ends bound to diisocyanates by urethane moieties.

Polyetheresters are thermoplastic copolymers made on one hand of polyesters sequences, produced by the reaction of dicarboxylic derivative (such as terephthalate) and diols (such as butanediol), and on the other hand of polyether sequences (such as polyalkylene (ether) glycol or polyol) (soft segments).

Hard segments preferably comprise polybutylene terephthalate (PBT) while soft segments comprise polyol long chain components. Preferably the hard segment has a molecular weight of 3000 to 9000, preferably of 5000 to 7000 g/mol. Preferably the polyol long chain components comprise polyethylene glycol (PEG), polypropylene glycol (PPG) or polypropylene ether glycol (PPEG), polytetramethylene Glycol (PTMG or PTHF) polytetramethylene ether Glycol, and combinations thereof. Preferably the polyol long chain components have a molecular weight of 200 to 4000 g/mol, preferably of 1000 to 3000 g/mol.

Examples of such polyetherester are Hytrel®, commercially available from DuPont, Arnitel®commercially available from Akzo Chimie, Lomod® commercially available from GE and Perprene® commercially available from Toyobo. Polyetheresterurethane corresponds to polyetherurethane in which the polyether sequences and isocyanates (urethanes) are separated by ester linkages.

Polyetheresteramides are the reaction products of the copolycondensation of polyamide blocks with reactive ends with polyether blocks with reactive ends, such as, among others, polyamide blocks with dicarboxylic chain ends with polyetherdiol blocks. The number average molecular mass of these polyamide blocks is generally between 500 and 10 000 and preferably between 600 and 5 000. The polyamide blocks of polyetheresteramides are preferably made up of polyamide 6, 6.6, 6.12, 11, 12 or 12.12 (PA-6, PA-6.6, PA-6.12, PA-11, PA-12, PA-12.12) or of copolyamides resulting from the polycondensation of their monomers.

The number-average molecular mass of the polyethers is generally between 200 and 6 000, and preferably between 600 and 3 000. The polyether blocks preferably consist of polytetramethylene glycol (PTMG), polypropylene glycol (PPG) or polyethylene glycol (PEG), homo- or copolymerized. The polyetheresteramides are preferably made up of 5 to 85% by weight of polyether and of 95 to 15% by weight of polyamide, and more preferably of 20 to 85% by weight of polyether and 80 to 15% by weight of polyamide.

Preferably these polyetheresteramides are polyether block amides in which the polyether blocks contain homo- or copolymerized PEG and preferably those in which the polyamide blocks are derived from PA-12, PA-11, PA-12.12, homo- or copolymerized, such as for example co-PA-6.12.

An example of a polyetheresteramide suitable in the present invention is Pebax®, commercially available from Arkema.

The polyester used in the invention is any polyester where the major part of it comprises any aromatic repeating ester units. The term polyester in this invention refers to a polymer that is obtained by condensation polymerization of an aromatic dicarboxylic acid such as terephthalic acid, 2,6-naphthalene dicarboxylic acid, isophthalic acid, phthalic acid, 4,4'-diphenyldicarboxylic acid, and of an aliphatic diol such as usually ethylene glycol or 1,4-butanediol.

These polymers, in addition to being homopolymers, may also be copolymers having a third component or several components. In this case, the dicarboxylic acid component may also be, for example, adipic acid, sebacic acid, decanedicarboxylic acid and 1,4-cyclohexane dicarboxylic acid; an oxycarboxylic acid can be used, for example, p-oxybenzoic acid or an sodium 5-sulfo isophthalic acid. The diol can be can be, for example, ethylene glycol, diethylene glycol, triethylene glycol, propylene glycol (both 1,2 and 1,3), butanediol, neopentyl glycol, 1,4-cyclohexane dimethanol, polyethylene glycol and polytetramethylene glycol.

Examples of such polyesters is (are) polyethylenenaphthalate (PEN), polybutyleneterephthalate (PBT), polyethyleneterephthalate (PET), the latter being the preferred polyester.

Mixtures are also possible, optionally with another polymer different from polyester. The intrinsic viscosity of the polyester that is used in the invention may vary from e.g. 0.45 to e.g. 0.7, measured in phenoltetrachloreethane at 30° C. The MW may vary within broad limits, as the skilled man will appreciate.

The mixture of polyether block copolymer and polyester of the present invention is a homogeneous mixture, i.e. any one of the component of the mixture is not a filler particle with respect to the other. Thus the film according to the present invention exhibits a very fine islands-sea structure where the minor component shows typical size lower than 300 nm, preferably in the range 100 to 200 nm or even lower. The bi-axially stretched breathable film according to this invention comprises a mixture which comprises, based on the total weight of the polymeric mixture, at least 50% wt of polyether block copolymer and from 1 to less than 50% wt of at least one polyester.

Preferably the polymeric mixture comprises at least 1% wt of at least one polyester. More preferably the polymeric mixture comprises from 50 to 95% wt of polyether block copolymer and 5 to 50% wt of at least one polyester. Preferably the polymeric mixture comprises at least 50% wt, preferably from 60 to 95% wt of a polyether block copolymer comprising hard segments comprising Polybutylene terephthalate (PBT) and soft segments, having a molecular weight of 200 to 4000 g/mol, preferably of 1000 to 3000 g/mol, comprising polyethylene glycol and/or Polypropylene Glycol and/or Polypropylene Ether Glycol and less than 50% wt, preferably at least 1% wt, preferably from 5 to than 40% wt of Polyethylene terephthalate.

The bi-axially stretched breathable film of the invention is preferably from 0.5 to 15 micrometers thick, preferably from 2 to 6 micrometers thick.

The film according to this invention exhibits good mechanical properties. Preferably, the film exhibits a tensile strength resistance of at least 30 N/mm$^2$, tensile strength measured according to ASTM D 882-80 (100%/min at room temperature).

The film according to the present invention offers good thermal properties. Preferably up to 60° C., preferably up to 70° C., more preferably up to 80° C., the film undergoes shrinkage of less than 5%, preferably less than 2.5%, more preferably less than 1.5%, shrinkage being determined by measuring film sample dimensions under constant zero load with an heating rate of 10° C./min in commercial available thermomechanical analyzer (e.g. Mettler Toledo TMA 40).

As already stated, the stretched film according to the present invention is breathable. In one embodiment, it exhibits a Moisture Vapour Transmission Rate (MVTR) of at least 250 g/m$^2$/day, preferably of at least 500 g/m$^2$/day, measured by standard ISO 15496 for a 15 micrometer thick film, at a temperature of 23° C.

The film of the invention shows no phase separation; the polymers in the film of the invention are well dispersed. The film may contain inorganic filler particles to improve the film handling and winding. Preferably the polyester contains the inorganic filler particles. Preferably the polyester contains particles in an amount from 1000 to 60000 ppm. The inorganic filler particles may be without limitation calcium carbonate, clays, silica, zeolites, silicone beads (functionalized polydimethyl siloxanes), dicalcium phosphates (DPC), tricalcium phosphates (TPC), cenospheres, zeeospheres, talc, titanium dioxides, barium sulfate and barium titanate. Filler particle size distributions can be monomodal, bimodal and trimodal. Preferably the mean particle diameter is comprised between 0.1 and 10 micrometers for a monomodal, bimodal and trimodal distribution.

The bi-stretched breathable film according to this invention can be associated (e.g. laminated, bonded through adhesive or not, co-extruded, (hot)-calendered, etc.) with another film or material or support. Preferably the film is laminated on another film or material or support, such as, for example, plastic, fibrous non-woven, fibrous fabric, woven fabric, stretch fabric, paper, polyolefin and polyester, etc.

The films according to the present invention have a reduced thickness compared to known films, exhibit good mechanical properties such as resistance to tensile stress and elasticity, thermal stability, and are breathable. Therefore such films are very useful in many applications such as the fabrication of apparel, filtration, packaging.

Particularly the films according to the present invention can be used in the fabrication of protective apparel such as medical gowns or chemical protective apparel, but also for the fabrication of outdoor or casual wears. These films can also be used for filtration, by producing membranes, such as reverse osmosis membranes, nanofiltration membranes, pervaporation membranes, ultrafiltration membranes, gas separation membranes. Furthermore, films according to the invention can be used as packaging materials, especially in modified atmosphere fresh-cut fruit and vegetable packaging materials where appropriate selectivities between $O_2$ and $CO_2$ are required.

The bi-axially breathable film according to the present invention can be obtained by bi-axially stretching the breathable film more preferably by simultaneous bi-axial stretching.

Such a method of bi-axial stretching has been described for example in U.S. Pat. No. 3,890,421, the content of which is incorporated herein by reference.

The method of producing the film according to the present invention comprises the step of casting the polymeric mixture of polyether block copolymer and polyester of the invention.

The polymeric mixture of polyether block copolymer and polyester can be blended and melted in an extruder. The extruder can be a single screw machine but preferably a twin screw machine. After dispersing and homogenizing in the extruder, the polymer blend is forced via the melting pump through a melt system composed of piping and filtration unit with residence times ranging from 5 to 30 minutes.

Preferably the cast film is obtained by forming the polymer in a slot die system and by cooling the film on a quench drum.

The cast polymeric mixture is then to be bi-axially stretched preferably simultaneously.

This simultaneously bi-axially stretching can be performed by the method comprising the steps of grasping sequentially successive portions of the cast film along opposite edges of the cast film with opposed pairs of clamps mounted on carriages; and of advancing the carriages downstream along paths adjacent a center line extending equidistant between the carriages after the clamps have grasped the film while maintaining the pairs of clamps aligned along a second line normal to the extent of the center line, said step of advancing the carriages further including the step of moving the carriages laterally away from the center line extending equidistant therebetween as the carriages advance downstream, where said advancement of the carriages is effected by accelerating each downstream carriage relative to the adjacent upstream carriage.

According to another embodiment of the present invention, this method is preferably to be applied for the production of a bi-axially stretched breathable film comprising at least one polyether block copolymer, i.e. any film comprising such a polymer, not necessarily together with a polyester.

Preferably the carriages each incorporate a movable element of a linear motor. In this case the advancement of the carriages is effected by exciting field windings of the stationary element of the linear motor with which each movable element is associated, and the method further comprises the step of exciting downstream field windings with progressively more energy than adjacent upstream field windings to accelerate each downstream clamp relative to the adjacent upstream clamp and thereby stretch the film longitudinally and laterally in the direction of advancement.

This preferred method is to be applied for the production either of a film according to the present invention, i.e. comprising a polymeric mixture of polyether block copolymer polyester, or of a bi-axially stretched breathable film comprising at least one polyether block copolymer.

Temperature at which stretching is carried out can be from 120 to 190° C.

Reference is also made to the following patents: U.S. Pat. Nos. 3,890,421, 4,675,582, 4,853,602, 4,825,111, 5,429,785, 5,885,501, 5,051,225 and 5,072,493, and to the LISIM® stretching method commercially available from Brückner, which are incorporated herein by reference.

Embodiments disclosed above with respect to the polyether in connection with the film comprising the polyester are also applicable to any film comprising at least one polyether.

According to a preferred embodiment of the present invention, for any of the afore-mentioned method, the stretching ratio is in the range of 2 to 5 times, preferably from 3 to 4.5 times.

Preferably the method further comprises a step of dimensional relaxation treating the bi-axially stretched film.

Preferably, the dimensional relaxation treatment is performed by advancing the carriages downstream along paths adjacent a center line extending equidistant between the carriages after the clamps have grasped the film while maintaining the pairs of clamps aligned along a second line normal to the extent of the center line, where said advancement of the carriages is effected by decelerating each downstream carriage relative to the adjacent upstream carriage, said step of advancing the carriages optionally further including the step of moving the carriages laterally towards the center line extending equidistant therebetween as the carriages advance downstream.

Preferably, the film obtained by the method after relaxation treatment has stable dimensions, meaning that the film shows substantially no more retraction after treatment.

After simultaneously stretching, the method can also comprise the step of heat treating the film.

According to one embodiment of the present invention, the method further comprises the step of associating at least one support the biaxially stretched film (comprising the polyether optionally with a polyester) with one member selected from the group consisting of plastic, fibrous, non-woven fabric, woven fabric, stretch fabric, paper, polyolefin and polyester.

Preferably the method further comprises the step of laminating the film on a support. More preferably, the lamination step is performed via a hot melt process. Preferably the method comprises the step of laminating the film via an hot melt process to an non-woven or fabric better a stretched fabric.

Association of the film according to the invention to any plastic can be done also by coextrusion, especially when the support is of the polyester type.

The following examples are illustrative of the invention, and should not be considered as limiting. The examples also comprise what is considered to be the best mode of the invention.

EXAMPLES

Example 1

Polyethylene terephthalate (PET) and an polyether block copolymer containing 55% weight of PBT and 45% weight of a polyalkyleneglycol of molar composition 64% propylene oxide and 36% ethylene oxide are introduced into an twin screw extruder, in respective amounts of 5% wt and 95% wt based on the total weight of the polymeric mixture. Water absorption of the polyether block copolymer based on ASTM D570 method after 24 hours at 23° C. for this polymer is 2.5%.

The whole is heated at a temperature of between 250 and 285° C.

A cast film is obtained by forming the polymer in a slot die system and by cooling the film on a quench drum. The cast film is subject to a bi-axial stretching film in a biaxial laboratory film stretcher (commercially available from Brueckner (Karo IV) or T. M Long or Inventure Laboratory Inc. In this technology, the film is gripped by clips which are simultaneously or sequentially moving in the machine direction and in the transverse direction).

The stretch is performed at a stretching ratio of 3.5 by 3.5.

After simultaneously stretching in the laboratory stretcher, the film is subject to a relaxation i.e. this means a dimensional change in the range of 5 to 10%, preferably 5 to 7.5% in machine and transverse direction by moving accordingly in both directions at room temperature.

The bi-axially stretched film obtained is between 10 and 15 micrometers thick.

Example 2

Polyethylene Terephtalate (PET) and the same polyether block copolymer as in example 1 are introduced into an single screw extruder, in respective amounts of 35% wt and 65% wt based on the total weight of the polymeric mixture.

Stretching and relaxation conditions are similar to the ones of example 1 except that stretching ratio is 3.0×3.0.

The bi-axially stretched film obtained is between 25 and 30 micrometers thick.

Example 3

Polyethylene Terephtalate (PET) and the same polyether block copolymer as used in example 1 are introduced into an twin screw extruder, in respective amounts of 50% wt and 50% wt based on the total weight of the polymeric mixture.

Stretching conditions are similar to the ones of example 1, but this time there is no relaxation.

The bi-axially stretched film obtained is between 15 and 20 micrometers thick.

Example 4

A polyether block copolymer composed by 46% weight PBT and 55% weight of polyalkylkeneglycol of molar composition 29% ethylene oxide and 71% propylene oxide was used. Water absorption based on ASTM D570 method after 24 hours at 23° C. for this polymer is 30%. A copolyester based on 10% weight copolyester PEG with molecular weight of 1000 g/mole and 2% weight sodium 5-sulfo isophthalic acid was mixed in a twin screw extruder with 95% weight of above polyether block copolymer.

Extrusion as well as stretching conditions are similar to example 1 except that stretching ratio is 3.0×3.0 and that relaxation is in range of 7.5 to 12.5%, preferably 7.5 to 10%.

The bi-axially stretched film obtained is between 15 and 20 micrometers thick.

Example 5

The same operating conditions as in example 4 are used, except that the polymeric mixture comprises a polyester. The bi-axially stretched film obtained is between 15 and 20 micrometers thick.

Example 6

The same operating conditions as in example 4 are used, excepted that the polymeric mixture comprises a polyester copolymer based on 17% weight isophtalate.

The bi-axially stretched film obtained is 15 to 20 micrometers thick.

Example 7

The same operating conditions as in example 6 are used, except that the stretching ratio is 3.5×3.5.

The bi-axially stretched film obtained is 15 to 20 micrometers thick.

Example 8

The same polymer mixture than used in example 6 is introduced in a twin screw extruder.

The stretching ratio is 3.5×3.5 and relaxation is in range of 7.5 to 12.5%, preferably 7.5 to 10%.

The bi-axially stretched film obtained is 10 to 15 micrometers thick.

Example 9

The same operating conditions as in example 8 are used, except that the stretching ratio is 4.0×4.0 and that relaxation is in range of 10 to 15%, preferably 10 to 12.5%.

The bi-axially stretched film obtained is 10 to 15 micrometers thick.

FIGS. 1 and 2 depict the shrinkage of film in function of the temperature and the evolution of the stress in function of the elongation of the film, respectively.

Example 10

The same operating conditions as in example 8 are used, except that the relaxation is performed in the range of 40 to 50%, preferably 45 to 50% at a temperature in the range of 100 to 170° C.

The bi-axially stretched film obtained is 10 to 15 micrometers thick.

Example 11

The same operating conditions as in example 8 are used, except that the relaxation is performed at about 25% at a temperature in range of 40 to 80° C.

The bi-axially stretched film obtained is 10 to 15 micrometers thick.

Example 12

The same operating conditions as in example 6 are used, except that the polymeric mixture comprises 15% weight of polyester and 85% of polyether block copolymer.

The bi-axially stretched film obtained is 15 to 20 micrometers thick.

Example 13

The same operating conditions as in example 12 are used, except that the stretching ratio is 3.5×3.5.

The bi-axially stretched film obtained is 15 to 20 micrometers thick.

Example 14

The same operating conditions as in example 7 are used except that the cast film is subject to an sequential stretching where MD stretching is performed at 6 times higher stretching speed than in TD. Stretching ratio is in range 3.3 to 3.5 times in MD respective to TD direction. No good stretched film was obtained with the sequential stretching method which is preferred for high PET content.

For all the above-mentioned examples save example 14, the breathability of the films is measured by standard ISO 15496 at a temperature of 23° C. The thickness is also given. The tensile strength of the films is measured per ASTM D882-80 at 100%/min. The shrinkage of the film is determined by the method of measuring film sample dimensions under constant zero load with an heating rate of 10° C./min in commercially available thermomechanical analyzer. Negative numbers indicate shrinkage of film while positive numbers mean film expansion. The thermal properties i.e the average shrinkages in MD and TD directions at 60, 80, 100 and 120° C. are determined. Results are given in the following table.

| Ex | Thickness (μm) | MVTR (g/m²/h) | MD tensile (N/mm²) | MD elong. (%) | TD tensile (N/mm²) | TD elong. (%) | Average MD/TD shrinkage (%) | | | |
|---|---|---|---|---|---|---|---|---|---|---|
| | | | | | | | 60° C. | 80° C. | 100° C. | 120° C. |
| 1 | 10 | 2700 | 73 | 120 | 85 | 200 | −0.1 | −2.5 | −6.5 | 11.7− |
| 2 | 27.5 | 613 | 80 | 147 | 131 | 119 | 0.3 | −1.7 | −8.0 | −16.0 |

-continued

| Ex | Thickness (μm) | MVTR (g/m²/h) | MD tensile (N/mm²) | MD elong. (%) | TD tensile (N/mm²) | TD elong. (%) | Average MD/TD shrinkage (%) | | | |
|---|---|---|---|---|---|---|---|---|---|---|
| | | | | | | | 60° C. | 80° C. | 100° C. | 120° C. |
| 3 | 20 | 247 | 130 | 90 | 112 | 100 | 0.1 | −0.8 | −4.3 | −9.8 |
| 4 | 17 | 12160 | 36 | 137 | 29 | 74 | 0.3 | −1.0 | −3.7 | −8.4 |
| 5 | 18 | 11026 | 41 | 205 | 50 | 288 | 0.3 | −1.3 | −4.3 | −9.6 |
| 6 | 18 | 6877 | 41 | 256 | 36 | 232 | 0.4 | −2.1 | −5.0 | −10.1 |
| 7 | 16 | 8822 | 69 | 274 | 42 | 248 | −0.1 | −2.3 | −5.3 | −10.5 |
| 8 | 18 | 10778 | 50 | 275 | 51 | 267 | 0.2 | −1.0 | −2.7 | −5.4 |
| 9 | 13 | 13627 | 46 | 168 | 46 | 198 | 0.2 | −1.2 | −3.1 | −6.2 |
| 10 | 17 | 9971 | 44 | 217 | 36 | 192 | 0.0 | −0.9 | −2.1 | −3.9 |
| 11 | 14.5 | 11799 | 36 | 131 | 47 | 199 | 0.6 | −0.1 | −2.2 | −5.4 |
| 12 | 20 | 513 | 59 | 203 | 50 | 184 | 0.4 | −4.3 | −7.1 | −10.7 |
| 13 | 12 | 1644 | 47 | 251 | 47 | 226 | −0.3 | −4.7 | −7.5 | −10.7 |

The invention claimed is:

1. A bi-axially stretched breathable film comprising a homogeneous polymeric mixture, said polymeric mixture comprising based on the total weight of the polymeric mixture
at least 50% by weight of at least one breathable polyether block copolymer, comprising between 55% by weight and 85% by weight of polyether, said breathable polyether block copolymer comprising hard segments comprising polybutylene terephthalate (PBT) and soft segments, having a I molecular weight of 200 to 3000 g/tool, comprising a polyethylene glycol and polypropylene glycol, said breathable polyether block copolymer exhibiting a weight increase at a temperature of 23° C. of 1.5% minimum after a 24-hour immersion in water according to the method of ASTM D570, and
from 0.5 to less than 50% by weight of at least one polyester.

2. The film according to claim 1, wherein the polymeric mixture comprises
said at least one breathable polyether block copolymer in an amount of from 50 to 95% by weight of said mixture; and
said at least one polyester in an amount of from 5 to less than 50% by weight of said mixture.

3. The film according to claim 1, wherein said breathable polyether block copolymer is selected from the group consisting of a polyetherester, a polyetheresterurethane, a polyetheresteramide and mixtures thereof.

4. The film according to claim 3, wherein said breathable polyether block copolymer is a polyetherester.

5. The film according to claim 1, wherein the film thickness is between 0.5 and 20 micrometers.

6. The film according to claim 1, wherein the film has a minimum Moisture Vapour Transmission Rate of at least 300 g/m²/day, where the moisture vapour transmission rate is given relative to a film of a thickness of 15 microns.

7. The film according to claim 1, wherein the film tensile strength is at least 35 N/mm².

8. The film according to claim 1, wherein at temperatures up to 60° C. the film shrinks by a value less than or equal to 1%, and/or wherein at temperatures up to 80° C. the film shrinks by a value less than or equal to 5%.

9. The film according to claim 1, wherein said film contains inorganic filler particles.

10. The film according to claim 1, which is further combined with at least one support selected from the group consisting of plastic, fibrous non-woven, woven fabric, stretch fabric, paper, polyolefin and polyester.

11. A packaged item, article of apparel, or membrane comprising the film according to claim 1.

12. The film according to claim 1, wherein the film thickness is in a range from 2 to 6 micrometers.

13. The film according to claim 1, wherein the film has a Moisture Vapour Transmission Rate in a range from 5000 g/m²/day to 15000 g/m²/day where the moisture vapour transmission rate is given relative to a film of a thickness of 15 microns.

14. The film according to claim 1, wherein the film tensile strength is in a range from 50 to 160 N/mm².

15. The film according to claim 1, wherein at temperatures up to 80° C. the film shrinks by a value in the range of 2.5 to 4%.

16. The film according to claim 1, wherein said film contains inorganic filler particles in an amount from 500 to 60000 parts per million (ppm).

17. The film according to claim 1, wherein the polyester is polyethylene terephthalate (PET) or a polyester copolymer.

18. A method for producing the film according to claim 1, comprising the steps of:
(1) forming the polymeric mixture as a cast film, and
(2) simultaneously or sequentially bi-axially stretching the cast film of step (1).

19. The method according to claim 18, wherein the simultaneously bi-axially stretching comprises the steps of:
(i) grasping sequentially successive portions of the cast film along opposite edges of the cast film with opposed pairs of clamps mounted on carriages;
(ii) advancing the carriages downstream along paths adjacent a center line extending equidistant between the carriages after the clamps have grasped the film while maintaining the pairs of clamps aligned along a second line normal to the extent of the center line, said step of advancing the carriages further including the step of moving the carriages laterally away from the center line extending equidistant therebetween as the carriages advance downstream, where said advancement of the carriages is effected by accelerating each downstream carriage relative to the adjacent upstream carriage.

20. The method according to claim 19, wherein the simultaneously bi-axially stretching comprises the steps of:
(i) grasping sequentially successive portions of the cast film along opposite edges of the cast film with opposed pairs of clamps mounted on carriages, wherein the carriages each incorporate a movable element of a linear motor;
(ii) advancing the carriages downstream along paths adjacent a center line extending equidistant between the carriages after the clamps have grasped the film while maintaining the pairs of clamps aligned along a second line normal to the extent of the center line, said step of advancing the carriages further including the step of moving the carriages laterally away from the center line extending equidistant therebetween as the carriages advance downstream, where said advancement of the carriages is effected by exciting field windings of the stationary element of the linear motor with which each movable element is associated; and (iii) exciting downstream field windings with progressively more energy than adjacent upstream field windings to accelerate each downstream clamp relative to the adjacent upstream clamp and thereby stretch the film longitudinally and laterally in the direction of advancement.

21. The method according to claim 18, wherein the stretching ratio is from 2 to 5 times.

22. The method according to claim 18, wherein the cast film is formed on a slot die and cooled on a quench drum.

23. The method according to claim 18, further comprising the step of dimensional relaxation treating the bi-axially stretched film obtained at step (2).

24. The method according to claim 23 comprising the step of:

(iv) advancing the carriages downstream along paths adjacent a center line extending equidistant between the carriages after the clamps have grasped the film while maintaining the pairs of clamps aligned along a second line normal to the extent of the center line, where said advancement of the carriages is effected by decelerating each downstream carriage relative to the adjacent upstream carriage, said step of advancing the carriages optionally further including the step of moving the carriages laterally towards the center line extending equidistant therebetween as the carriages advance downstream.

25. The method according to claim 18, further comprising the step of heat-treating the film after stretching.

26. A method according to claim 18, further comprising the step of combining the bi-axially stretched film with at least one support selected from the group consisting of plastic, fibrous, non-woven fabric, woven fabric, stretch fabric, paper, polyolefin and polyester.

27. The method according to claim 26, wherein the film is laminated on said support.

28. The method according to claim 27, wherein the film is laminated via a hot melt process.

29. The method according to claim 18, wherein the at least one polyester comprises PET or PET copolymer, and said PET or PET copolymer is present from 15 to 50% by weight, and wherein the stretching is sequential.

30. The method according to claim 18, wherein the stretching ratio is from 3 to 4.5 times.

* * * * *